United States Patent [19]

Ernst et al.

[11] 4,042,086
[45] Aug. 16, 1977

[54] APPARATUS FOR CONNECTING A CLUTCH RELEASE BEARING TO A CLUTCH RELEASE ACTUATING ELEMENT

[75] Inventors: Horst M. Ernst, Eltingshausen; Manfred Brandenstein, Aschfel; Armin Olschewski, Schweinfurt, all of Germany

[73] Assignee: SKF Industrial Trading and Development Company B.V., Amsterdam, Netherlands

[21] Appl. No.: 725,149

[22] Filed: Sept. 20, 1976

Related U.S. Application Data

[63] Continuation of Ser. No. 508,088, Sept. 23, 1974, abandoned.

[30] Foreign Application Priority Data

Oct. 2, 1972 Germany .............................. 7335937

[51] Int. Cl.$^2$ ............................................. F16D 19/00
[52] U.S. Cl. .................................. 192/98; 192/109 A
[58] Field of Search ................... 192/98, 110 B, 99 R, 192/99 A, 99 S, 109 A

[56] References Cited

U.S. PATENT DOCUMENTS

| | | | |
|---|---|---|---|
| 1,609,741 | 12/1926 | Taylor | 192/99 S |
| 2,093,799 | 9/1937 | Bemis | 192/110 B X |
| 2,250,394 | 7/1941 | Reed | 192/99 R |
| 2,840,208 | 6/1958 | Zeidler | 192/99 R |
| 3,099,340 | 7/1963 | Camp | 192/99 S |
| 3,213,990 | 10/1965 | Gorelov et al. | 192/99 S X |
| 3,250,357 | 5/1966 | Zeidler | 192/99 S X |
| 3,277,988 | 10/1966 | Pitner | 192/98 |

FOREIGN PATENT DOCUMENTS 2,005,892   8/1971   Germany ............................. 192/98

Primary Examiner—Samuel Scott
Assistant Examiner—Lance W. Chandler

[57] ABSTRACT

A clutch release bearing having an outer cap provided with at least one extending lug is connected to a clutch release actuating element by a flat spring having a planar shank at one end adapted to be connected to the lug and a planar shank at the other end adapted to be articulatingly connected to the actuating element. The spring is bent between the end shanks in an unstressed condition wherein the shanks lie at an acute angle to each other. During assembly the spring is further bent so that its shanks lie substantially over one another and the spring is in stressed condition.

3 Claims, 5 Drawing Figures

APPARATUS FOR CONNECTING A CLUTCH RELEASE BEARING TO A CLUTCH RELEASE ACTUATING ELEMENT

This application is a continuation of Ser. No. 508,088 filed Sept. 23, 1974 now abandoned.

BACKGROUND OF THE INVENTION

The present invention relates to apparatus for connecting a clutch release bearing particularly for motor vehicles with a clutch release actuating element.

Clutch release bearings comprising an anti-friction roller bearing inserted within a sheet metal cap are well known. It is known to provide the metal cap with integral lugs which are acted upon by a release actuating device such as a lever. Retaining springs are generally employed for attaching the actuating devices or lever elements to the cap of the clutch release bearings. These retaining springs consist of a bent spring and a retaining plate secured at the lug of the metal cap. This arrangement has the drawback that in order to eliminate play between the actuating element and the clutch and the rest surface on the release bearing itself separate and additional spring means are required.

It is the object of the present invention to provide a clutch release bearing which avoids the disadvantages and drawbacks of the prior art devices.

It is a further object of the present invention to provide connection between a clutch release bearing and the clutch release actuating element which is simpler and less expensive to manufacture and employ and which effectively eliminates any degree of play between the two.

It is another object of the present invention to provide apparatus for connecting a clutch release bearing with an actuating element which may be easily assembled and joined to the clutch.

SUMMARY OF THE INVENTION

According to the present invention apparatus for connecting a clutch release bearing having an outer cap provided with at least one lug is provided comprising a flat spring having a planar shank at one end adapted to be connected to the lug and a planar shank at the other end adapted to articulatingly engage the clutch release actuating element. The spring is bent between the end shanks so that in an unstressed condition the shanks lie at an acute angle to each other and in a stressed or assembled condition with the respective lug and actuating element the shanks substantially overlie each other with a defined stress.

The advantage of the present construction lies in the fact that a positive connection is obtained at each end of the spring with the lug and with the clutch release actuating element respectively, under predefined degree of spring stress so that the play is virtually eliminated between the actuating element and the clutch release bearing. The spring rate or degree of stress may be varied to defined degrees and the spring apparatus itself is easily removable and replaceable. Further, the articulating connection between the spring and the clutch release actuating element is also maintained.

In a preferred form of the present invention, the shank engaging with the clutch release actuating element comprises a planar rest plate having an integral wall along one of its sides extending perpendicular thereto and a web extending from the wall at right angles to the wall overlying the rest plate and spaced therefrom. This construction allows the hook-like end of the clutch release actuating element to be positively retained under spring tension and still be articulatingly movable with respect to the spring.

In another advantageous embodiment of the present invention the shank adapted to be connected to the lug is U-shaped and has its side walls bent slightly inwardly at its ends to provide a spring-like socket connection for attachment to the lug. Full details of the present invention are set forth in the following description and are shown in the accompanying drawings.

DESCRIPTION OF THE INVENTION

Figure 1:
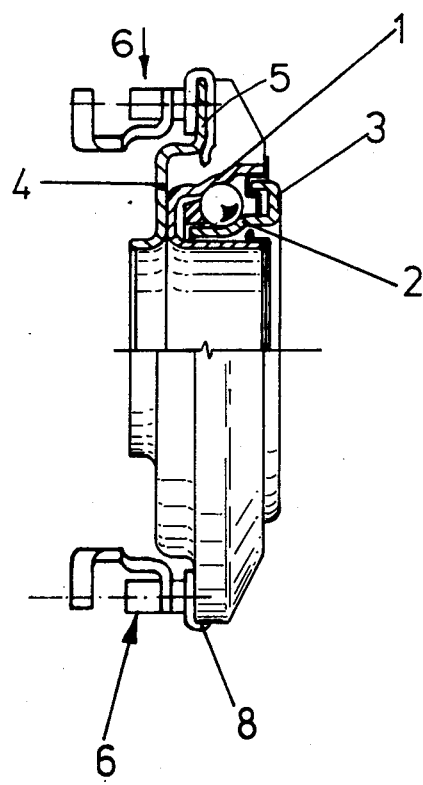
FIG. 1 is a side view, partially in section, of a clutch release bearing with connecting spring apparatus according to the present invention.
Figure 2:
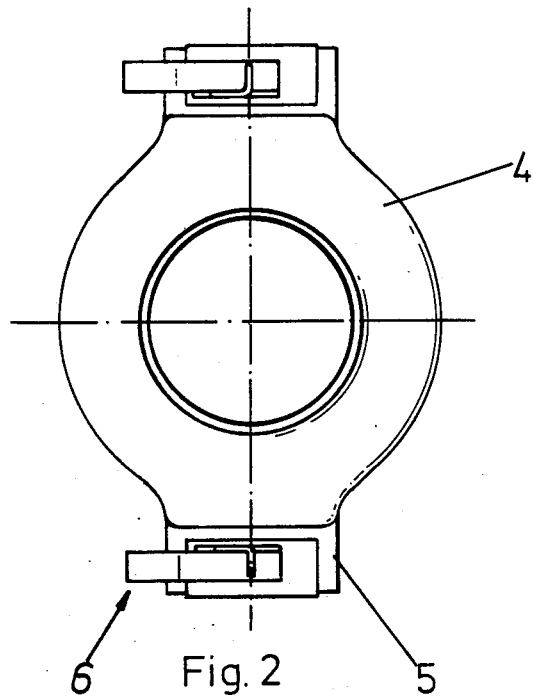
FIG. 2 is an end view of the bearing shown in FIG. 1.
Figure 3:
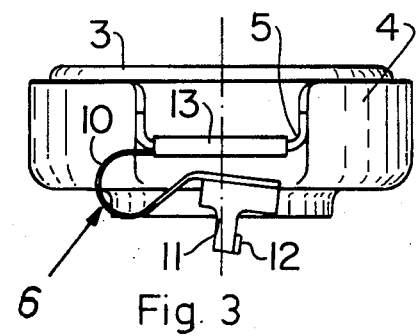
FIG. 3 is a plan view of the clutch release bearing shown in FIG. 1.

As seen in FIG. 1 the clutch release bearing comprises an outer race ring 1 and an inner race ring 2 both formed of sheet metal. The inner ring 2 is provided with a radially extending flange 3 which functions as the pressure or contact plate for the clutch (not shown). A plurality of roller bodies, such as balls are located in a cage arranged between the inner end and outer race rings, which have race surfaces inclined to the axial center of the bearing. Surrounding the anti-friction bearing is a sheet metal cap 4 which covers the assembly and which is in contact with the outer race ring 1. The sheet metal cap 4 is provided with a pair of laterally extending lugs 5 or ears more clearly seen in FIG. 2 on each of which is removably attached a resilient connector, generally depicted by the numeral 6. The resilient connector 6 connects with the clutch release actuating element 7, seen in FIG. 4 which clutch actuating element 7 is adapted to maintain the clutch release bearing fixed axially as well as in its peripheral direction. The clutch release actuating element 7 comprises a lever having a hooked-like end having a circular outer edge and a inwardly extending slot, as seen more clearly in FIG. 4.

Figure 4:
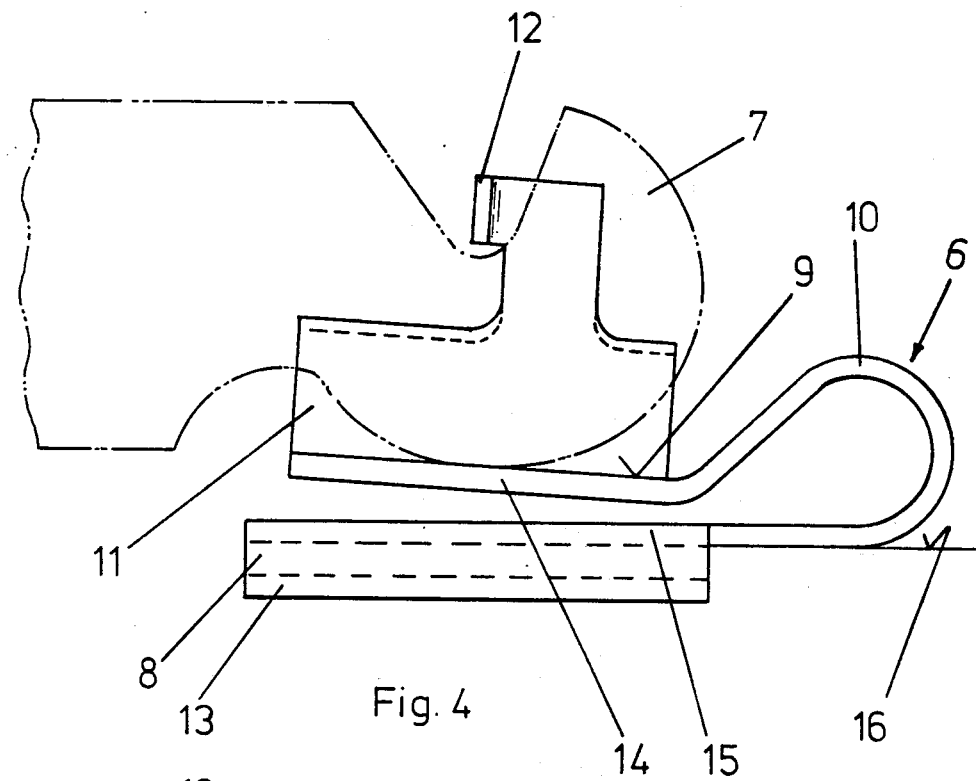
FIG. 4 is a side view, greatly enlarged, of the spring connecting apparatus engaging the end of the clutch release actuating element.
Figure 5:
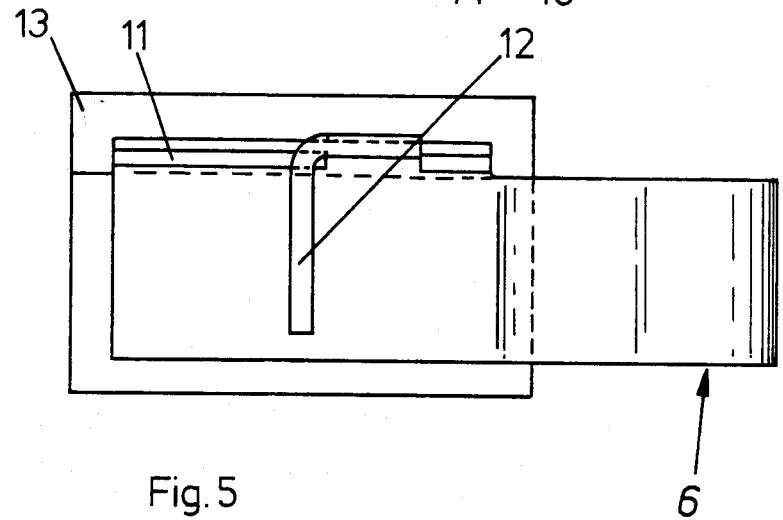
FIG. 5 is a plan view of the spring connecting apparatus shown in FIG. 4.

The resilient connector 6 comprises as is seen from FIGS. 4 and 5 a substantially flat elongated spring strip formed at one end into a U-shaped supporting plate 8 adapted to slip socket-like over the lug 5 and at its other end into an engaging configuration for movably engaging and receiving the hook-like end of the actuating element 7 comprising a rigid hardened planar rest surface 9 adapted to slidably engage the circular edge of the actuating element 7. The connecting member 6 is formed intermediate its ends with a bent or curved strip 10 which provides the spring-like action. An integral wall 11 extends upwardly at right angles to the rest plate 9 along one of its side edges and terminates in a web section 12 which is again bent at right angles to the plane of the wall 11 to overlie the plate 9 at a distance from the surface of the plate 9. The web 12 extends within the hook of the actuating element 7 and thus cooperates with the plate 9 to insure that the element 7 is securely connected with the resilient connector 6. The U-shaped supporting plate 8 at the other end of the connector 6 is formed so that its lateral sides 13 are bent inwardly at one end so as to form a resilient socket requiring that the U-shaped plate 8 be forced with some degree of pressure slidably onto the lug 5. This insures that this end is fixedly connected to the lug 5 during operation of the clutch release bearing.

Before connecting the actuating element 7 to the connector 6 the intermediate bent spring section 10 of the resilient connector 6 are not placed under stress condition but are bent only so that the end shank 14, on which the rest plate 9 is formed, lies at an acute angle with the shank 15 on which the support plate 8 is formed. Thus once the resilient connector 6 is assembled between the clutch release actuating element 7 and the lug 5 on the clutch release bearing cap 4, the bent spring portion 10 is stressed to form a hair-pin curve as seen in FIG. 4 by forcing the shank 14 into a virtual parallel condition overlying the shank 15. This creates a definite spring stressing and tensioning in the resilient connector 6 which insures a continued outward biasing and flexure of the shank ends. As a result, a positive contact is maintained at all times between the resilient connector 6 and the hook end of the clutch release actuating element. Because of the flat plate engaging the curved edge of the release element 7 and the web 12 entering into the slot movement between the spring and the clutch release actuating element can be maintained even under the stress conditions.

The degree of stress may be varied either being made larger or smaller according to the desired need, by manipulating the bend in the spring section 10. By properly stressing the spring section 10 play between the actuating arm and the clutch release bearing is effectively prevented under all operating conditions.

Furthermore, the resilient connector 6 is easily removable and replaced should that become necessary.

Various changes and modifications will be obvious to those skilled in the present art. Accordingly, applicant intends that the present disclosure be taken as illustrative only and not limiting of the present invention.

What is claimed is:

1. In a clutch release bearing having an outer cap provided with at least one extending lug adapted to engage a clutch release actuating element comprising a hook-like end having a curved outer edge and a slot opening along an inner edge, a connecting element comprising a flat spring member having a shank at one end adapted to be connected to said lug and a shank at the other end having a planar surface forming a rest plate for slidably engaging said curved outer edge, said spring being bent between said end shanks in an unstressed condition wherein said shanks lie at an acute angle to each other and which may thereafter be bent so that said shanks substantially overlie each other when connected to said lug and when slidingly engaging said clutch release actuating element so as to be in stressed condition, said spring being further formed with a perpendicular wall integral with said planar surface forming said rest plate along one side thereof and a web extending from said wall at right angles thereto overlying said planar surface and slidingly engaging within said slot.

2. The apparatus according to claim 1, wherein said shank end connected with said lug is bent along its sides to form a U-shaped retaining member engageable about said lug.

3. The apparatus according to claim 2, wherein the sides of said U-shaped retaining member are bent slightly inwardly at one end.

* * * * *